(12) United States Patent
Cheng et al.

(10) Patent No.: US 6,177,874 B1
(45) Date of Patent: Jan. 23, 2001

(54) LIQUID SUPPLYING DEVICE FOR PROVIDING CHEMICAL SOLUTION WITH A LIQUID LEVEL SENSOR

(75) Inventors: Ching-Chih Cheng, Hsinchu Hsien; Wen-Liang Fang, Hsinchu; Kuo-Feng Huang, Chu-Pei; Hung-Lung Ma, Miao-Li Hsien, all of (TW)

(73) Assignee: United Microelectronics Corp., Hsinchu (TW)

( * ) Notice: Under 35 U.S.C. 154(b), the term of this patent shall be extended for 0 days.

(21) Appl. No.: 09/074,057

(22) Filed: May 7, 1998

(30) Foreign Application Priority Data

Apr. 4, 1998 (TW) .................................................. 87205094

(51) Int. Cl.⁷ .................................................... G08B 21/00
(52) U.S. Cl. ......................... 340/618; 340/603; 340/612; 340/619; 250/902; 250/904; 250/577; 73/293
(58) Field of Search ..................................... 340/603, 612, 340/618, 619; 250/904, 902, 577; 73/293

(56) References Cited

U.S. PATENT DOCUMENTS

| | | | |
|---|---|---|---|
| 4,468,567 | * 8/1984 | Sasano et al. | 250/577 |
| 4,713,552 | * 12/1987 | Denis et al. | 250/577 |
| 4,880,971 | * 11/1989 | Danisch | 250/577 |
| 4,899,585 | * 2/1990 | Kulha | 73/293 |
| 5,077,482 | * 12/1991 | Vali et al. | 250/577 |
| 5,384,515 | * 1/1995 | Head et al. | 313/607 |
| 5,684,296 | * 11/1997 | Hamblin et al. | 250/227.11 |

* cited by examiner

*Primary Examiner*—Julie Lieu
(74) *Attorney, Agent, or Firm*—Thomas, Kayden, Horstemeyer & Risley

(57) ABSTRACT

A liquid supplying device comprising a liquid container for storing a liquid so as to supply an external device and a liquid level sensor for detecting the liquid level. As the liquid within the liquid container is gradually used up, liquid level drops. As soon as the remaining liquid in the container drops to a predetermined amount, the liquid level sensor emits a warning signal to the operator, and the operator can then replenish the liquid in the container.

5 Claims, 2 Drawing Sheets

LIQUID SUPPLYING DEVICE FOR PROVIDING CHEMICAL SOLUTION WITH A LIQUID LEVEL SENSOR

CROSS-REFERENCE TO RELATED APPLICATION

This application claims the priority benefit of Taiwan application serial no. 87205094, filed Apr. 4, 1998, the full disclosure of which is incorporated herein by reference.

BACKGROUND OF THE INVENTION

1. Field of Invention

The present invention relates to a liquid supplying device. More particularly, the present invention relates to a liquid supplying device equipped with a liquid level sensor suitable for providing a chemical solution to a spin-on-glass (SOG) station.

2. Description of Related Art

FIG. 1 is a sketch showing a conventional liquid supplying device. The liquid supplying device utilizes a capacitor-type of sensor for detecting liquid level. In FIG. 1, the liquid supplying device includes a liquid container 10 placed within an external vessel 11. The liquid container 10 contains a chemical solution 12, and the whole assembly including the solution 12, the liquid container 10 and the external vessel are placed over a capacitor sensor 13.

Chemical solution 12 within the container 10 is able to flow out through a capillary tube to supply a SOG station. As the chemical solution 12 inside the container 10 is gradually used up, the capacitor sensor is able to detect a drop in weight for the whole assembly. Eventually, when the liquid level has dropped below a minimum, a warning signal is emitted so that a user can replenish the chemical solution 12 in the container 10, or simply replace the container 10. Since SOG station must receive the chemical solution 12 continuously, a reliable method of detecting liquid level in a supplying device before the chemical solution 12 runs out is very important.

However, the chemical solution 12 in the liquid container 10 is capable of reacting with air to form crystal particles. These crystal particles add some weight to the whole assembly that includes the chemical solution 12, external vessel 11 and liquid container 10. Therefore, it is possible that even when all the chemical solution 12 inside the container 10 has already been used up, the overall weight is still not low enough to generate any warning signal. Alternatively, if the sensitivity of the capacitor sensor 13 is low, a warning signal may be emitted even though the liquid level in the container 10 is still relatively high.

Consequently, there is an error in detecting the amount of residual solution in the container 10 with a conventional capacitor type of sensor. Hence, problems such as a warning signal not being emitted in time to allow for the replenishing of solution or a false alarm being given when the container is still relatively full can occur from time to time.

In light of the foregoing, there is a need to provide a liquid supplying device equipped with a better level-sensing device.

SUMMARY OF THE INVENTION

Accordingly, the present invention is to provide a liquid supplying device that has a detecting device capable of accurately monitoring the amount of residual liquid within a container.

In another aspect, this invention provides a liquid supplying device whose minimum amount of residual liquid within a container before triggering an alarm can be adjusted according to specific needs.

To achieve these and other advantages and in accordance with the purpose of the invention, as embodied and broadly described herein, the invention provides a liquid supplying device. The device comprises a liquid container for storing a liquid and a liquid level sensor for detecting the liquid level. The liquid level sensor is fixed relative to the bottleneck of the liquid container. As the liquid within the liquid container is gradually used up, liquid level drops. As soon as the remaining liquid in the container drops to a predetermined amount, the liquid level sensor will emit a signal warning the operator that the liquid level is too low, and is time to replenish liquid. Furthermore, by simply lowering or raising the liquid level sensor relative to the liquid container, the amount of liquid remaining in the container before a warning signal is emitted can be set to meet the demands in different situations.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
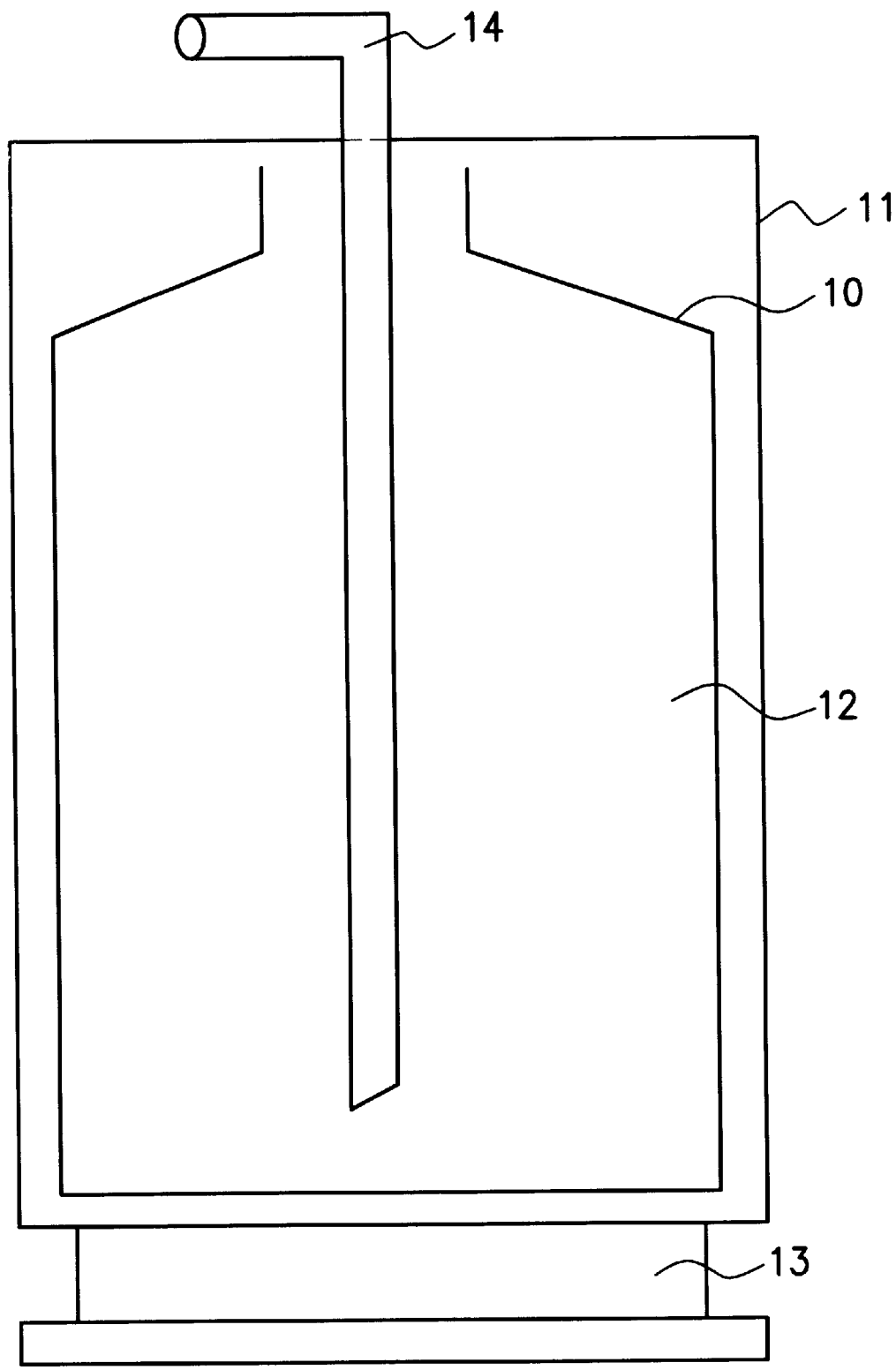
FIG. 1 is a sketch showing a conventional liquid supplying device.

Reference will now be made in detail to the present preferred embodiments of the invention, examples of which are illustrated in the accompanying drawings. Wherever possible, the same reference numbers are used in the drawings and the description to refer to the same or like parts.

Figure 2:
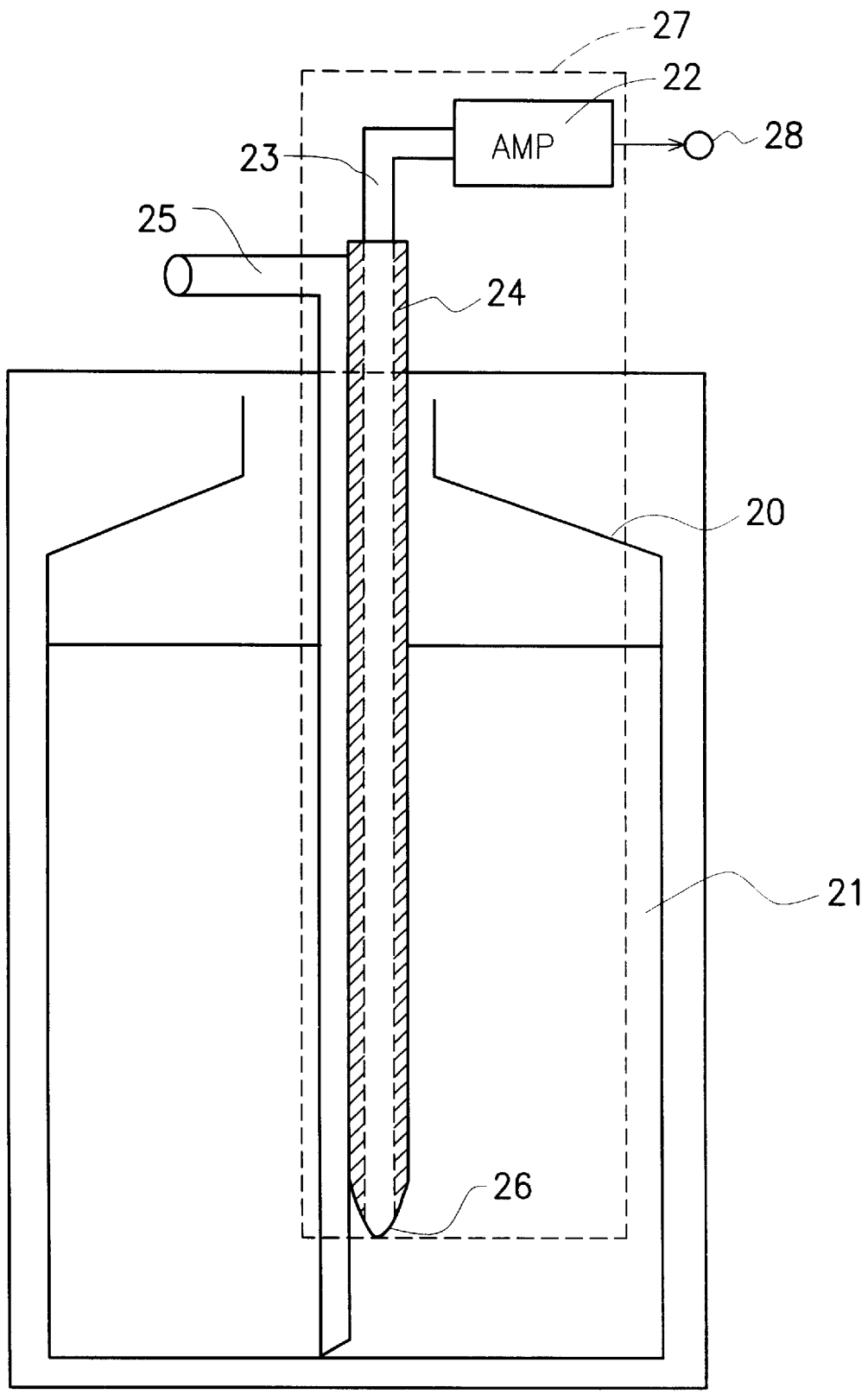
FIG. 2 is a sketch showing a liquid supplying device according to one preferred embodiment of this invention.

FIG. 2 is a sketch showing a liquid supplying device according to one preferred embodiment of this invention.

The liquid supplying device of this invention is suitable for supplying a chemical solution to a SOG station, for example, a DNS 60A station the DNS 60A station is a DiaNippon Screen machine from MFG. Co. Ltd—a Japan company. The device comprises a liquid container 20 for storing a liquid 21 that can be a chemical reagent, and a liquid level sensor 27 for detecting liquid level.

The liquid level sensor 27, for example, includes an amplifier unit 22 for amplifying the detected signal and a fiber photoelectric sensor 23. The fiber photoelectric sensor 23 is used for detecting the level of chemical solution 21 inside the container 20 and then transmitting a signal to the amplification unit 22. Furthermore, there is a sheath 24, preferably made from Teflon, enclosing the fiber photoelectric sensor 23. The sheath 24 protects the sensor 23 against possible erosion by the chemical solution 21. As shown in FIG. 2, the sheath 24 encloses the sensor 23, except that the tip 26 of the sensor 23 is exposed to the liquid 21. Therefore, while the liquid drops to a level lower than the tip 26, the tip 26 is consequently exposed to an air inside of the liquid container 20. Furthermore, still referring to FIG. 2, the fiber photoelectric sensor 23 is made of optical fiber as an integral in a required shape. In this particular embodiment, the fiber photoelectric sensor 23 has a rod or bar shape with a sharp tip 26 at one end thereof.

Chemical solution 21 can supply a SOG station by flowing out through a capillary tube 25. As the chemical solution 21 is gradually used up, liquid level drops. When the liquid level has dropped to the tip 26 of the fiber photoelectric sensor 23, only a certain residual amount of solution is remaining inside the container 20. The sensor 23 will immediately generate a signal to the amplifier unit 22, and then the amplified signal is transmitted to a warning device 28. Hence, the SOG station operator can have sufficient time to replenish or replace the chemical solution 21 in the container 20.

In addition, by varying the tip 26 position relative to the container 20, the amount of residual solution in the container 20 before the fiber photoelectric sensor 23 take action to send out warning signal can be different. Therefore, the amount of residual solution in the container 20 can be adjusted to fit particular design requirement.

In summary, the liquid level sensor of this invention is able to provide highly accurate liquid level detection. Moreover, adjustments can be made so that a warning signal can be given for various amounts of residual solution in the container.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A liquid supplying device chemical solution, comprising:

a liquid;

a liquid container for storing the liquid;

a fiber photoelectric sensor entirely made of an optical fiber that fits into the liquid container, wherein the fiber photoelectric sensor is used for detecting the liquid level of the liquid inside the liquid container by making contact with the liquid, and then generating a detected signal when the liquid level has dropped to a predetermined residual level that exposes a tip of the optical fiber;

a capillary tube that also fits into the liquid container for conducting the liquid, wherein the tube enables the outflow of the liquid from the liquid container; and a sheath for protecting the fiber photoelectric sensor against chemical erosion, wherein the fiber photoelectric sensor is enclosed by the sheath except that the tip is exposed to the liquid when the liquid level is higher than the tip, or an air inside the liquid container when the liquid level is dropped lower than the tip.

2. The device of claim 1, wherein the fiber photoelectric sensor is connected to an amplifier unit for amplifying the detected signal.

3. The device of claim 1, wherein the protective sheath is made from a material that includes Teflon.

4. The device of claim 1, wherein the amount of residual liquid inside the container before the fiber photoelectric sensor sends out a signal is varied by changing the vertical position of the sensor with respect to the container.

5. A liquid supplying device for providing chemical solution to a spin-on-glass, comprising:

a SOG liquid;

a liquid container for storing the SOG liquid;

a fiber photoelectric sensor that fits into the liquid container, wherein the fiber photoelectric sensor is used for detecting liquid level of the SOG liquid stored inside the liquid container by making contact with the liquid, and then generating a detected signal when the liquid level has dropped lower than a tip of the fiber photoelectric sensor;

a capillary tube that also fits into the liquid container, wherein the capillary tube is used for conducting the SOG liquid out of the liquid container; and a Teflon sheath for protecting the fiber photoelectric sensor again chemical erosion, wherein a main body of the fiber photoelectric sensor is enclosed by the sheath, while the tip of the fiber photoelectric sensor is exposed by the sheath.

* * * * *